(12) United States Patent
Gagvani et al.

(10) Patent No.: US 8,804,997 B2
(45) Date of Patent: Aug. 12, 2014

(54) APPARATUS AND METHODS FOR VIDEO ALARM VERIFICATION

(75) Inventors: Nikhil Gagvani, Potomac Falls, VA (US); Philip Allen Robertson, Leesburg, VA (US)

(73) Assignee: CheckVideo LLC, Falls Church, VA (US)

( * ) Notice: Subject to any disclaimer, the term of this patent is extended or adjusted under 35 U.S.C. 154(b) by 959 days.

(21) Appl. No.: 12/174,225

(22) Filed: Jul. 16, 2008

(65) Prior Publication Data

US 2009/0022362 A1    Jan. 22, 2009

Related U.S. Application Data

(60) Provisional application No. 60/950,019, filed on Jul. 16, 2007.

(51) Int. Cl.
     *G06K 9/00*      (2006.01)
(52) U.S. Cl.
     USPC ........................................................ 382/100
(58) Field of Classification Search
     CPC combination set(s) only.
     See application file for complete search history.

(56) References Cited

U.S. PATENT DOCUMENTS

| | | | |
|---|---|---|---|
| 4,857,912 A | 8/1989 | Everett, Jr. et al. | |
| 5,486,819 A | 1/1996 | Horie | |
| 5,708,423 A | 1/1998 | Ghaffari et al. | |
| 5,712,830 A | 1/1998 | Ross et al. | |
| 5,801,618 A | 9/1998 | Jenkins | |
| 5,809,161 A | 9/1998 | Auty et al. | |
| 5,875,305 A | 2/1999 | Winter et al. | |
| 5,956,716 A | 9/1999 | Kenner et al. | |
| 6,069,655 A * | 5/2000 | Seeley et al. | 348/154 |
| 6,091,771 A * | 7/2000 | Seeley et al. | 375/240 |
| 6,154,133 A | 11/2000 | Ross | |
| 6,400,265 B1 * | 6/2002 | Saylor et al. | 340/531 |
| 6,464,140 B1 | 10/2002 | Weigel | |
| 6,618,074 B1 * | 9/2003 | Seeley et al. | 348/143 |
| 6,625,383 B1 | 9/2003 | Wakimoto et al. | |
| 6,842,193 B2 | 1/2005 | Shimose | |
| 6,940,998 B2 | 9/2005 | Garoutte | |
| 6,956,599 B2 | 10/2005 | Lim et al. | |
| 6,975,220 B1 | 12/2005 | Foodman et al. | |

(Continued)

FOREIGN PATENT DOCUMENTS

| | | |
|---|---|---|
| WO | WO 03/026305 | 3/2003 |
| WO | WO 2006/034135 | 3/2006 |
| WO | WO 2006/101477 A1 * | 9/2006 |

OTHER PUBLICATIONS

International Search Report and Written Opinion for International Application No. PCT/US2008/070134, mailed Oct. 7, 2008, 8 pg.

(Continued)

*Primary Examiner* — Bhavesh Mehta
*Assistant Examiner* — Tahmina Ansari
(74) *Attorney, Agent, or Firm* — Cooley LLP

(57) ABSTRACT

A method for verification of alarms is disclosed. The method involves receiving an alarm signal trigger associated with an alarm signal, receiving video data from a premise associated with the alarm signal, rapidly analyzing the video data to test for the existence a significant event, and when a significant event exists, sending a representation of a segment of interest of the video data, the segment of interest being associated with the significant event, to a user.

34 Claims, 16 Drawing Sheets

(56) References Cited

U.S. PATENT DOCUMENTS

| | | | |
|---|---|---|---|
| 7,015,806 B2 | 3/2006 | Naidoo et al. | |
| 7,050,631 B2 | 5/2006 | Bian et al. | |
| 7,113,090 B1* | 9/2006 | Saylor et al. | 340/539.18 |
| 7,203,620 B2 | 4/2007 | Li | |
| 7,209,035 B2 | 4/2007 | Tabankin et al. | |
| 7,262,690 B2 | 8/2007 | Heaton et al. | |
| 7,342,489 B1 | 3/2008 | Milinusic et al. | |
| 7,403,116 B2 | 7/2008 | Bittner | |
| 7,450,172 B2 | 11/2008 | Lee et al. | |
| 7,460,148 B1* | 12/2008 | Clark et al. | 348/143 |
| 7,486,183 B2 | 2/2009 | Luebke et al. | |
| 7,555,146 B2* | 6/2009 | Huang et al. | 382/115 |
| 7,612,666 B2 | 11/2009 | Badawy | |
| 7,636,121 B2 | 12/2009 | Matsumoto et al. | |
| 7,679,507 B2 | 3/2010 | Babich et al. | |
| 7,847,820 B2 | 12/2010 | Vallone et al. | |
| 7,859,591 B2 | 12/2010 | Tanaka et al. | |
| 7,956,735 B2 | 6/2011 | Jackson | |
| 8,334,763 B2 | 12/2012 | Jackson | |
| 2002/0067258 A1 | 6/2002 | Lyons et al. | |
| 2003/0081836 A1 | 5/2003 | Averbuch et al. | |
| 2003/0164764 A1* | 9/2003 | Lyons et al. | 340/541 |
| 2004/0143602 A1* | 7/2004 | Ruiz et al. | 707/104.1 |
| 2004/0183668 A1* | 9/2004 | Campbell et al. | 340/506 |
| 2005/0132414 A1 | 6/2005 | Bentley et al. | |
| 2005/0132424 A1 | 6/2005 | Lowe et al. | |
| 2005/0134450 A1 | 6/2005 | Kovach | |
| 2006/0041330 A1* | 2/2006 | Ansari et al. | 700/240 |
| 2006/0093190 A1* | 5/2006 | Cheng et al. | 382/115 |
| 2006/0165386 A1 | 7/2006 | Garoutte | |
| 2006/0167595 A1 | 7/2006 | Breed et al. | |
| 2006/0195569 A1 | 8/2006 | Barker | |
| 2007/0094716 A1 | 4/2007 | Farino et al. | |
| 2007/0152807 A1* | 7/2007 | Huang et al. | 340/521 |
| 2007/0177800 A1 | 8/2007 | Connell | |
| 2007/0262857 A1 | 11/2007 | Jackson | |
| 2007/0263905 A1 | 11/2007 | Chang et al. | |
| 2008/0272902 A1* | 11/2008 | Kang et al. | 340/506 |
| 2008/0284580 A1* | 11/2008 | Babich et al. | 340/502 |
| 2009/0022362 A1* | 1/2009 | Gagvani et al. | 382/100 |
| 2009/0141939 A1 | 6/2009 | Chambers et al. | |
| 2010/0290710 A1 | 11/2010 | Gagvani et al. | |
| 2011/0090334 A1* | 4/2011 | Hicks et al. | 348/143 |
| 2011/0234829 A1 | 9/2011 | Gagvani | |
| 2011/0279259 A1 | 11/2011 | Jackson | |
| 2013/0121527 A1 | 5/2013 | Chambers et al. | |

OTHER PUBLICATIONS

International Search Report and Written Opinion for International PCT Application No. PCT/US2008/084835, mailed Feb. 4, 2009, 7 pgs.

Website information, MTeye Wireless Video Verification and Remote Viewing Solutions, May 4, 2007, http://mteye.co.il/home/index.aspx.

Website information, Q-See 16 Ch MPEG4 DVR 250 GB HDD with Built-in DVD Burner, May 14, 2007, http://www.costco.com/Browse//Product.aspx?Prodid=1120047&whse=BC&topnav=&browse=.

Website information, Swann Alert DVR Camera Kit, May 14, 2007, http://www.costco.com/Browse//Product.aspx?Prodid=11206961&whse=BC&topnav=&browse=.

Website information, The iControl Solution, iControl Networks, May 14, 2007, http://www.icontrol.com/howWorksMain.jsp.

Website information, Videofied, May 14, 2007, http://www.videofied.com/en/What_is_Videofied/.

Office Action for U.S. Appl. No. 11/803,851, mailed Aug. 4, 2010.

Office Action for U.S. Appl. No. 13/083,635, mailed Dec. 8, 2011.

International Search Report and Written Opinion for International Application No. PCT/US2010/032013, mailed Jun. 28, 2010, 8 pages.

Office Action for U.S. Appl. No. 09/234,688, mailed Dec. 10, 1999.

Office Action for U.S. Appl. No. 09/234,688, mailed Apr. 12, 2000.

Office Action for U.S. Appl. No. 13/524,571, mailed Mar. 21, 2013, 11 pages.

Supplementary European Search Report and Opinion for European Application No. 08796198, mailed Jul. 24, 2013, 10 pages.

* cited by examiner

APPARATUS AND METHODS FOR VIDEO ALARM VERIFICATION

The present application claims priority under 35 U.S.C. §119(e) to U.S. Provisional Application Ser. No. 60/950,019, filed Jul. 16, 2007, the disclosure of which is expressly incorporated by reference herein in its entirety.

BACKGROUND

1. Field of Technology

The present application discloses video analysis technology (described in part in U.S. Pat. No. 6,940,998 (the "'998 patent"), the disclosure of which is incorporated herein by reference) that can analyze video streams and identify content of interest based on the characteristics and motions of people and objects in the video streams.

2. Background of the Invention

Traditional security and monitoring systems rely on various sensors to trigger an alarm condition. Because such sensors are relatively undiscerning, such systems will always suffer from false alarms. An alarm can be triggered by an authorized or benign cause, such as a motion detector being triggered by a pet or a window or door contact getting dirty. False alarms lead to frustration and wasted resources.

Although surveillance and security systems can employ motion detectors, the effective range of the motion detectors is relatively limited. This can be impractical, obtrusive or otherwise undesirable. Motion detectors with extremely high sensitivity can be used to detect motions at higher ranges; however, such detectors will be plagued by false alarms from relatively minor and benign motion at a closer range. What is needed, then, is a security system that can verify alarm conditions before alerting a user.

Current security systems send an alarm message to a central monitoring station. This alarm cannot be visually verified, and the typical response is via audio or phone communication to the alarming facility to speak with a person who can confirm or deny the alarm. This is time-consuming and burdensome, especially if the alarm is false, which is the case for a majority of alarms.

Video cameras on the monitored premise can be used for verification; however the intruder or alerting condition may have left the scene or ceased motion by the time an operator in a central monitoring station has the opportunity to view the video feed corresponding to the sensor that caused the alarm. Even if the video can be made available at the central monitoring station in time to display a significant event in progress, it is physically impractical and costly for the security service provider to deploy sufficient manpower to manually view and assess all of the alarming video streams without a way of triaging the information. An automated verification technique that lets personnel at the central station receive verified video contemporaneously with the alarm is therefore desirable. Furthermore, verified video can be used by the end-customer and other security and law enforcement personnel to proactively respond to alarm conditions.

SUMMARY OF THE INVENTION

A method for verification of alarms is disclosed. The method involves receiving an alarm signal trigger associated with an alarm event, receiving video data from a premise associated with the alarm signal, analyzing the video data to test for the existence of a significant event, and when a significant event exists, sending a representation of a segment of interest of the video data, the segment of interest being associated with the significant event, to a user or another device. The video data may be analyzed at the premise. The alarm signal trigger may be generated by analysis of the video data itself, rather than by a separate sensor or other trigger source.

DETAILED DESCRIPTION

Figure 1:
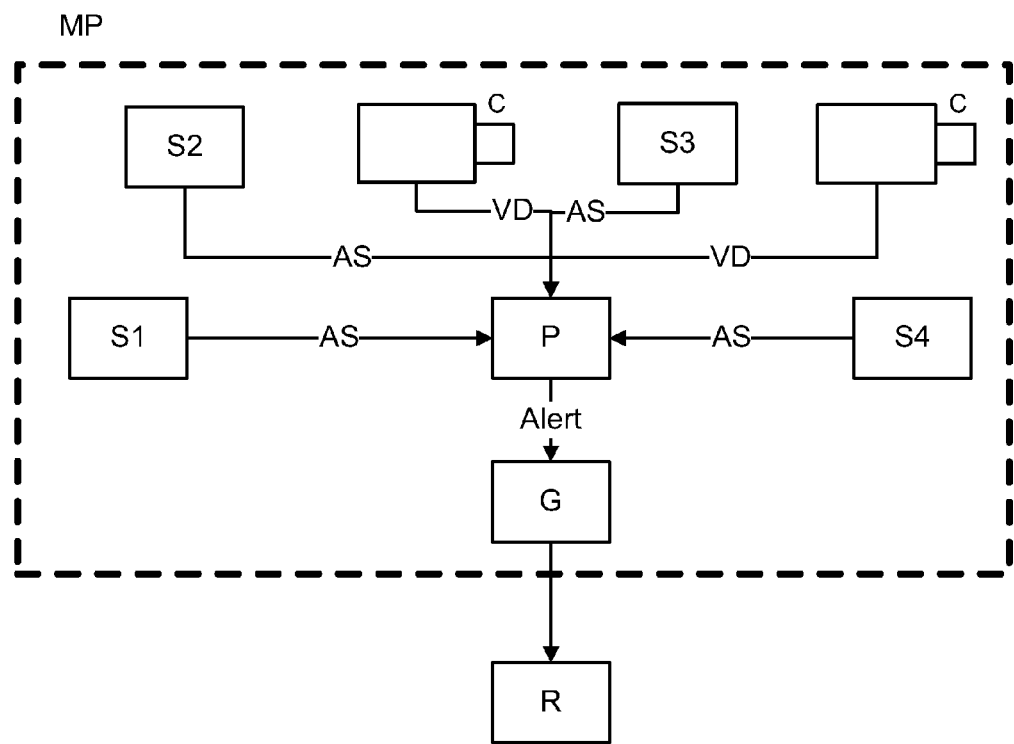
FIGS. 1-2 are schematic representations of a system and method for verifying an alarm.
Figure 2:
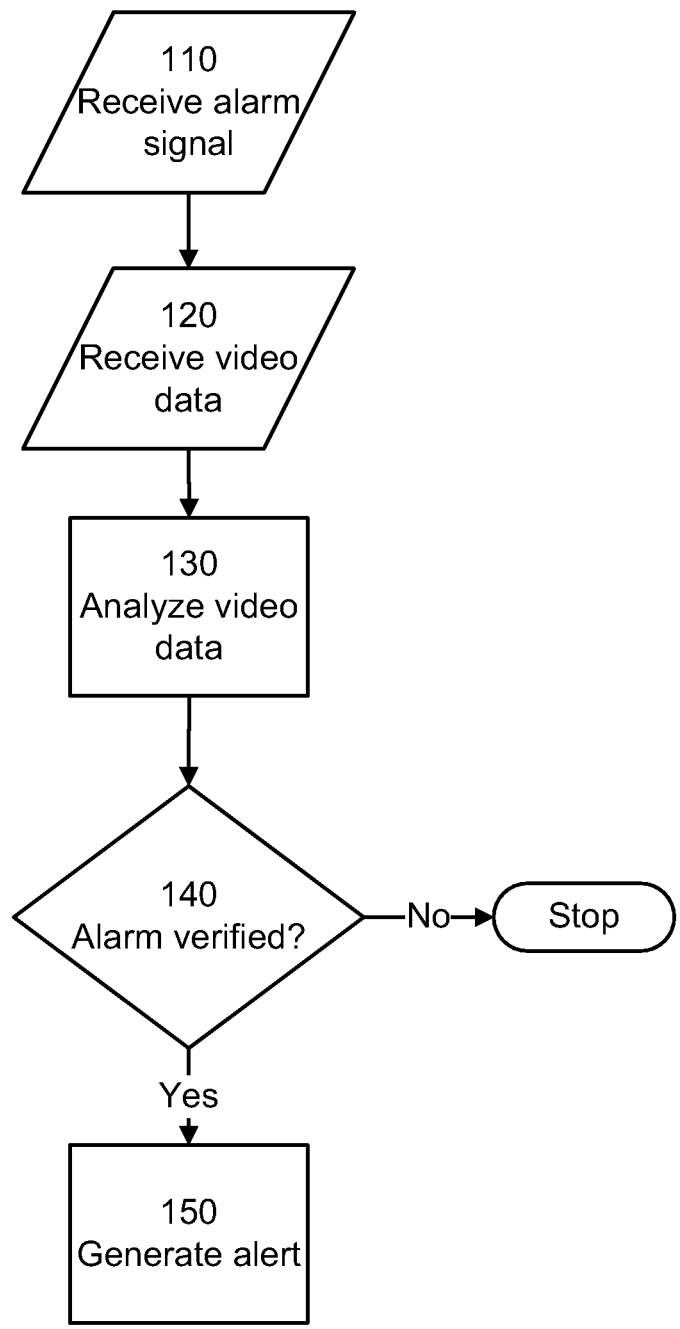

FIGS. 1 and 2 schematically illustrate an exemplary system and method to verify alarms, in which video analytics are used to confirm or deny an alarm condition, for example an alarm condition triggered by a traditional security sensor. As shown in FIG. 1, a monitored premise MP can be monitored by one or more video cameras C and one or more alarm sensors S (e.g. S1, S2, S3, and S4, as shown). A processor P can be operatively coupled to the camera(s) to receive video data VD and to the alarm sensor(s) to receive alarm signals AS. Processor P can include video analytics capability (such as that disclosed in the incorporated '998 patent, and as described below) to analyze video data VD and other functionality to process alarm signals AS, etc., and to generate an alert when appropriate. A communications gateway G can be operatively coupled to processor P to receive an alert from processor P, and to forward the alert to desired recipient(s) R, which may be outside the monitored premise MP.

Monitored premise MP can be any physical location that may be desirable to monitor, such as a residence, business, parking facility, recreation facility, perimeter (such as a fence or gate), roadway, walkway, or any portions thereof. Video cameras C can be any type of camera with any capabilities and features desired, and may be stationary or portable, be capable of imaging in the visible, infrared, ultraviolet, or other portion of the spectrum, may include tilt, sweep, and/or other motion capabilities, zoom, brightness compensation, etc. Alarm sensors S may also be of any desired type, including motion, window/door opening, glass breakage, infrared, sound, pressure, tension, magnetic, temperature, humidity, fire or smoke, or other input devices such as security keypad, card swipe, or biometric input (iris, face, finger or palm print, etc.) Cameras C and alarm sensors S may be coupled to processor P by any suitable communications link capable of carrying video data VD and/or alarm signals AS, including wired or wireless (including RF, IR, laser, Bluetooth, WiFi, etc.), and/or via a packet-switched network. Processor P can be any suitable device capable of receiving video data VD and alarm signals AS and processing those data and signals using video analytics and other suitable techniques, and generating an alert to be communicated to recipient(s) R via communications gateway G. Similarly, a communications gateway G can be any suitable device capable of interfacing with a desired communications network. The system can be used with various types of broadband data services such as broadband over power line (BPL), cable, DSL, and wireless broadband.

The video analytics capability of processor P can be used to confirm the presence or existence of anomalous or otherwise undesirable circumstances such as an intruder or a broken or open door or window at monitored premise MP. An exemplary process is illustrated in FIG. 2. At step 110, an alarm signal AS generated by an alarm sensor S is received (e.g. by processor P. At step 120, video data VD is received, e.g. from a camera C for which video data VD is relevant to determining whether alarm signal AS is associated with an event of interest. For example, if alarm sensor S is a window opening sensor, such that alarm signal AS indicates that the associated window has been opened, video data VD may be received from a camera C that includes the associated window in its field of view. At step 130, video data VD is analyzed. For example, video analytics techniques may be applied to video data VD to determine if the window has in fact been opened, and/or whether a person has entered (or exited) the open window. At step 140, the results of the analysis of the video data VD are used, along with other suitable parameters, to determine whether the alarm is verified. If the alarm is verified, then at step 150, an alert is generated for transmission to a recipient R. If the alarm is not verified, the processing of the alarm signal AS stops.

The video analytics capability of processor P can be of any suitable type, as will be apparent to the artisan. Known video analytics techniques identify video content of interest and control responses. Given raw video data provided by video source, for example a video camera or network connection, video analytics techniques can process the video data progressively from pixels to blobs to objects to targets to behavior. For example, video data from a video source can first be received by a background subtraction filter. The background subtraction filter acts as a change detector, and can filter video data to identify pixels that have changed compared to a background. During background subtraction, pixels from the video data are treated to a first level of processing to conduct segmentation to produce a segmented image. The background can then be maintained based on a background maintenance model and updated over time, either as a whole or in part based on the degree of qualified change. A threshold or a set of thresholds can be used to qualify the sensitivity and noise rejection capability of the background subtraction filter. These thresholds can also be determined adaptively based on the content of the video identified in future filter steps.

A blob labeling filter can receive data associated with the segmented image, connect groups of adjacent pixels into a single object blob, and label them uniquely. Blobs can be generated using the method described in the '998 patent. Noise blobs and other blobs of interest can be identified, effectively segmenting changes from the background. The blob labeling filter can produce a list of blobs and their properties, including geometric properties and appearance properties.

Subsequently, objects can be correlated over consecutive frames of video data to identify targets, which are simply objects that exist over multiple frames. This results from tracking over the course of consecutive frames. Tracking is the process of assigning correspondences between objects from frame to frame, analyzing blob properties over time and determining a correlation between blobs across frames to identify targets. Once blobs have been correlated over multiple frames, trajectories or tracks for those blobs can be calculated.

Targets can then be classified into different classes of interest. Classification can perform additional analysis on the target and compute a confidence of the target being a member of one of several classes, such as persons, vehicles, packages, noise blobs, etc.

Video analytics such as those described above can make use of the efficient video analytics described in the incorporated '998 patent that can be run on relatively simple and inexpensive hardware, such as a personal computer and an associated off-the-shelf operating system, or other techniques known to the artisan. Such video analytics can be implemented in processor P in software running on a general purpose processor, in firmware, on an application-specific integrated circuit (ASIC), etc.

Many variations on, and specific implementations of, the broad concepts discussed above are possible. Analysis of video data VD generated by camera(s) C can take place in any one or more of a variety of physical locations. For example, rather than being located at the monitored premise MP, the video analytics capability can be located at a central station, at a network analysis server, and/or distributed at multiple sites according to processing capabilities.

Each camera C can include integrated video analytics capability. This provides several additional options. For example, each camera C can analyze its own video data VD and determine that an alarm condition exists, and thus generate an alarm signal AS as well as video data VD. Thus, a camera C disposed to view a window at the monitored premise MP. Camera C can continually analyze the video data VD that it produces, and determine that the window has been opened, and/or that an object has passed through the window, and/or that such object is a person. Depending on the parameters provided to the analytics on the camera C, an alarm signal may be generated on any or all of these conditions. The capabilities of processor P may be included within camera C, such that camera C can essentially confirm its own alarm signal, generate an alert, and forward the alert to gateway G for transmission to recipient R. Further, the capabilities of gateway G may also be integrated into camera C, so that camera C is fully self-sufficient to generate and send alerts based solely on its own analysis of its own video data.

As a further variation, camera C may be operatively coupled directly to one or more alarm sensors S. Camera C may be activated by an alarm signal AS received from alarm sensor S, to begin analysis of its own video data, and/or to begin transmitting video data VD to other devices, such as processor P. Camera C may use alarm signal AS as an input to its own analysis of its own video data, e.g. to confirm the results using video analysis that a window has been opened.

Figure 3:
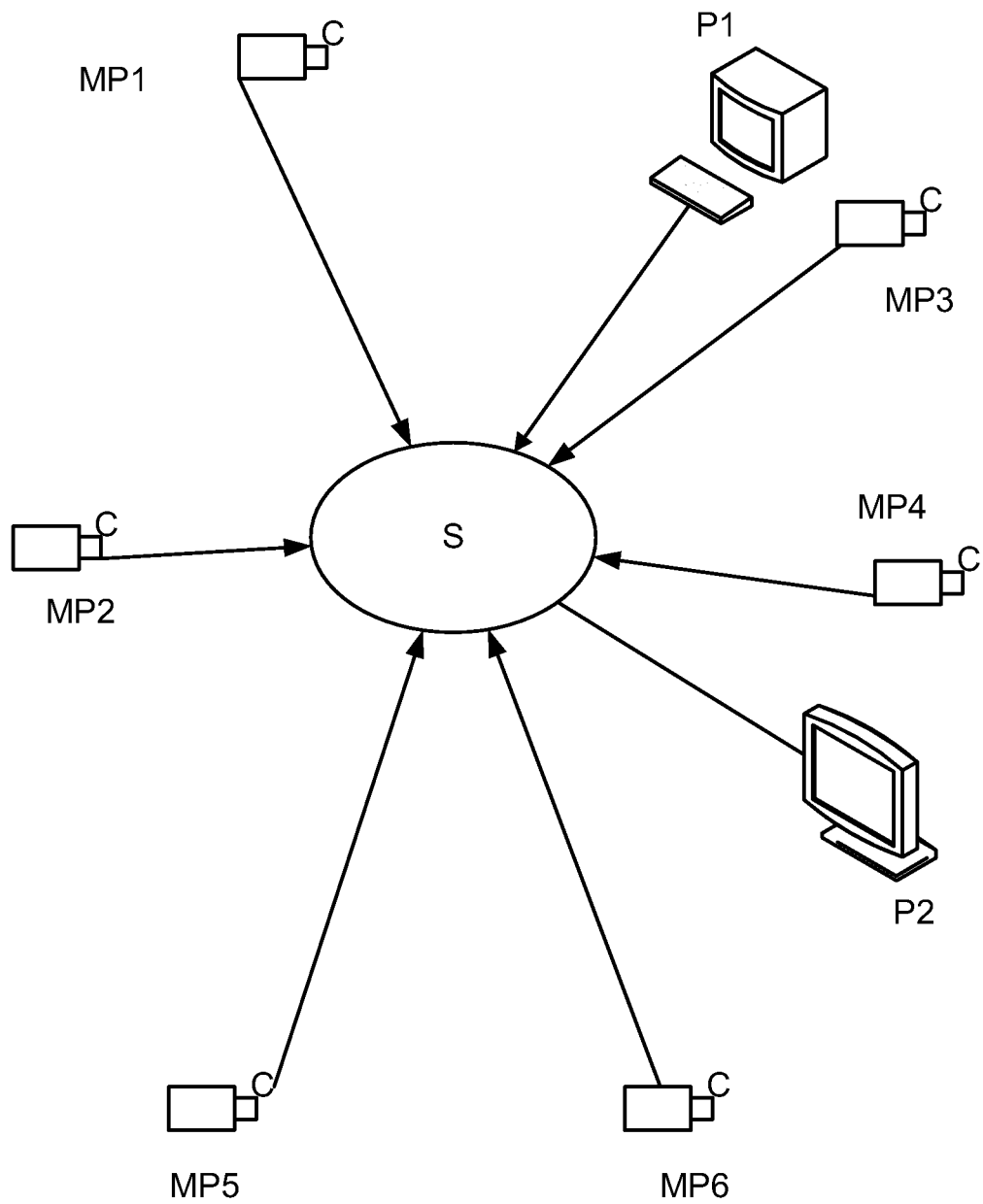
FIG. 3 is a schematic representation of a geographically distributed alarm verification system.

The components of the system shown in FIG. 1 may be part of a larger system or network, for example, a geographically-distributed network as shown schematically in FIG. 3. The system can be distributed over a network, for example, a local area network, wide area network, or the Internet. There may be many monitored premises MP distributed through a community, state, region, nation, etc. As noted above, the video analytics can be incorporated at one or more processor nodes P across the monitored network system, for example at personal computers or similar processors at various locations used in conjunction with, or incorporated into, cameras C. Video analytics can also be incorporated into a central server, or on multiple distributed servers for load balancing.

Figure 4:
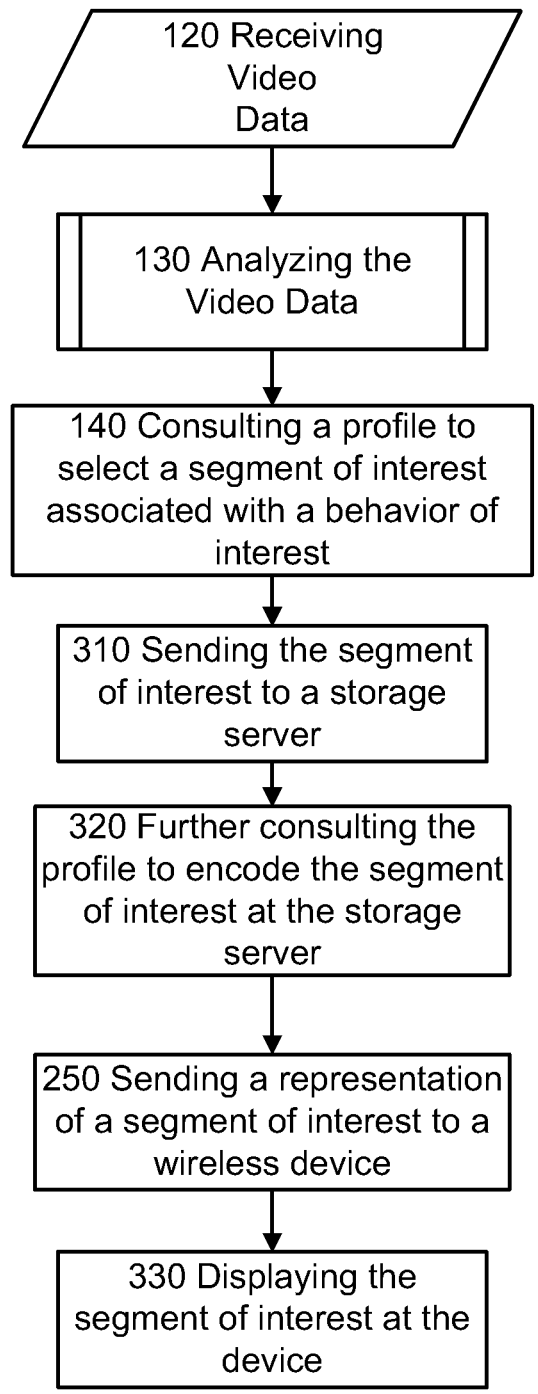
FIGS. 4-6 schematically illustrate alerts being pushed to a variety of recipient devices.

FIG. 4 illustrates an embodiment of a novel method that leverages video analytics to provide the trigger to capture an excerpt of video and provide an associated alarm. The embodiment of FIG. 4 does not require an external sensor—the video analytics processes all incoming video from an incoming stream associated with some monitored premise MP. The analytics is constantly assessing the input video for the existence of a significant event as specified by a user in a user profile (described in more detail below). In this embodiment, the trigger and verification steps collapse into a single step. This embodiment can be very useful where it is impractical to employ an external physical sensor, such as where the area to be monitored is generally physically inaccessible but within a convenient field of view.

In practice, the embodiment of FIG. 4 receives video data VD associated with a monitored premise 120; continuously performs video analysis on the video data VD 130 to search for motion, ghosting, or other activity or events, and constantly consults a user-defined profile to determine whether any sensed activity or behavior represented on the video matches something defined by the user in the profile as an event of significance; and, if found, selects the segment of interest of the video data VD that contains the event of significance 140. In the method of FIG. 4, the segment of interest is transmitted to a central storage server to be cached 310. The storage server then consults the user-defined profile to determine how to disseminate an alert associated with the event of significance, including how to encode a representative video excerpt 320. The method then includes sending some representation of the segment of interest to a user's wireless device 250. The encoding selected at step 320 takes into account the transmission limitations associated with the recipient user's wireless device in specifying the encoding to use. Finally, the method of FIG. 4 includes displaying the representation of the segment of interest to the user at the user's wireless device 330. Because this novel method also caches the segment of interest at a storage server, the user or another authorized person can additionally download the segment of interest using a different level of encoding and/or compression at another time, for example for further, more careful or comprehensive review or study of the segment of interest.

Figure 5:
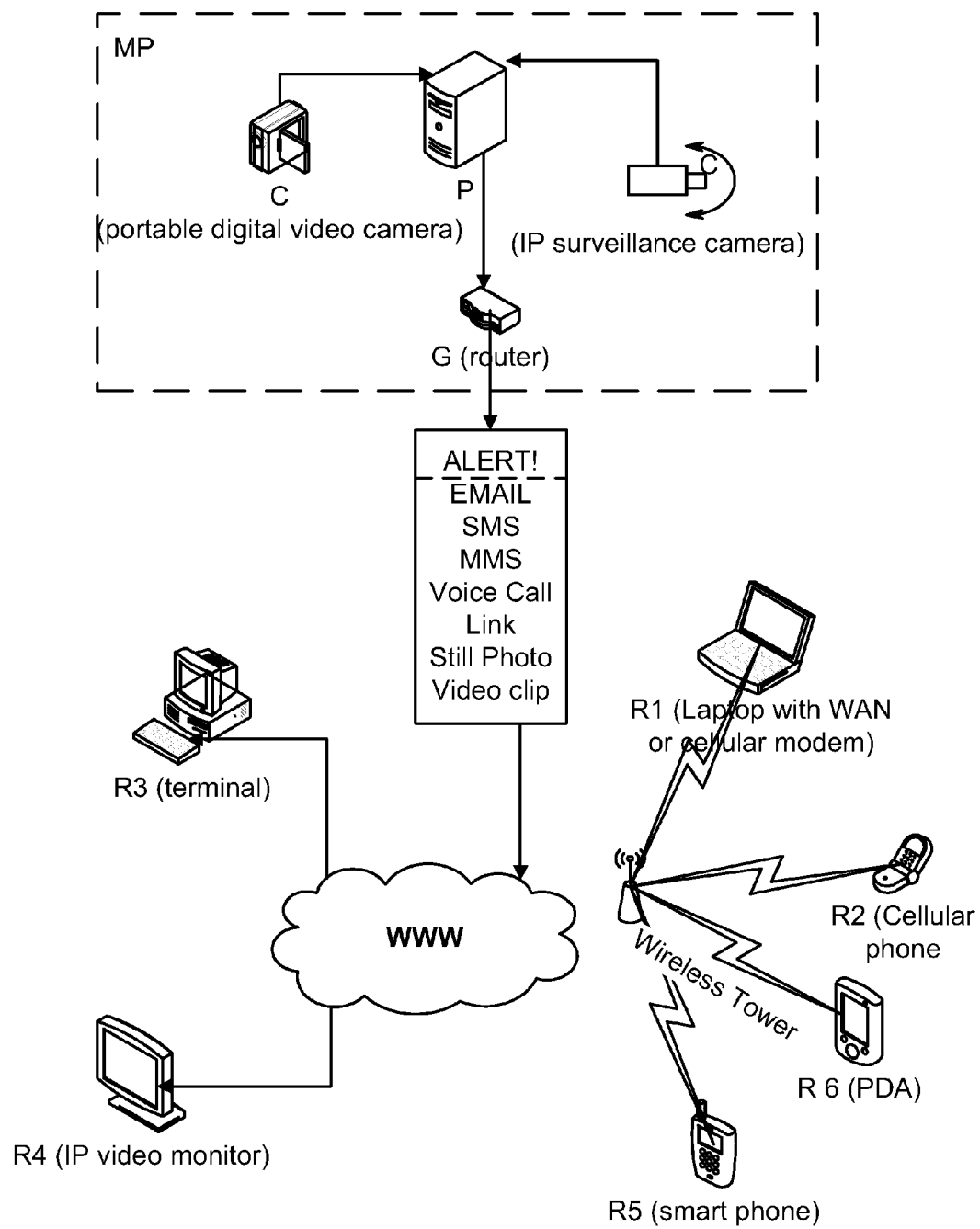
Figure 6:
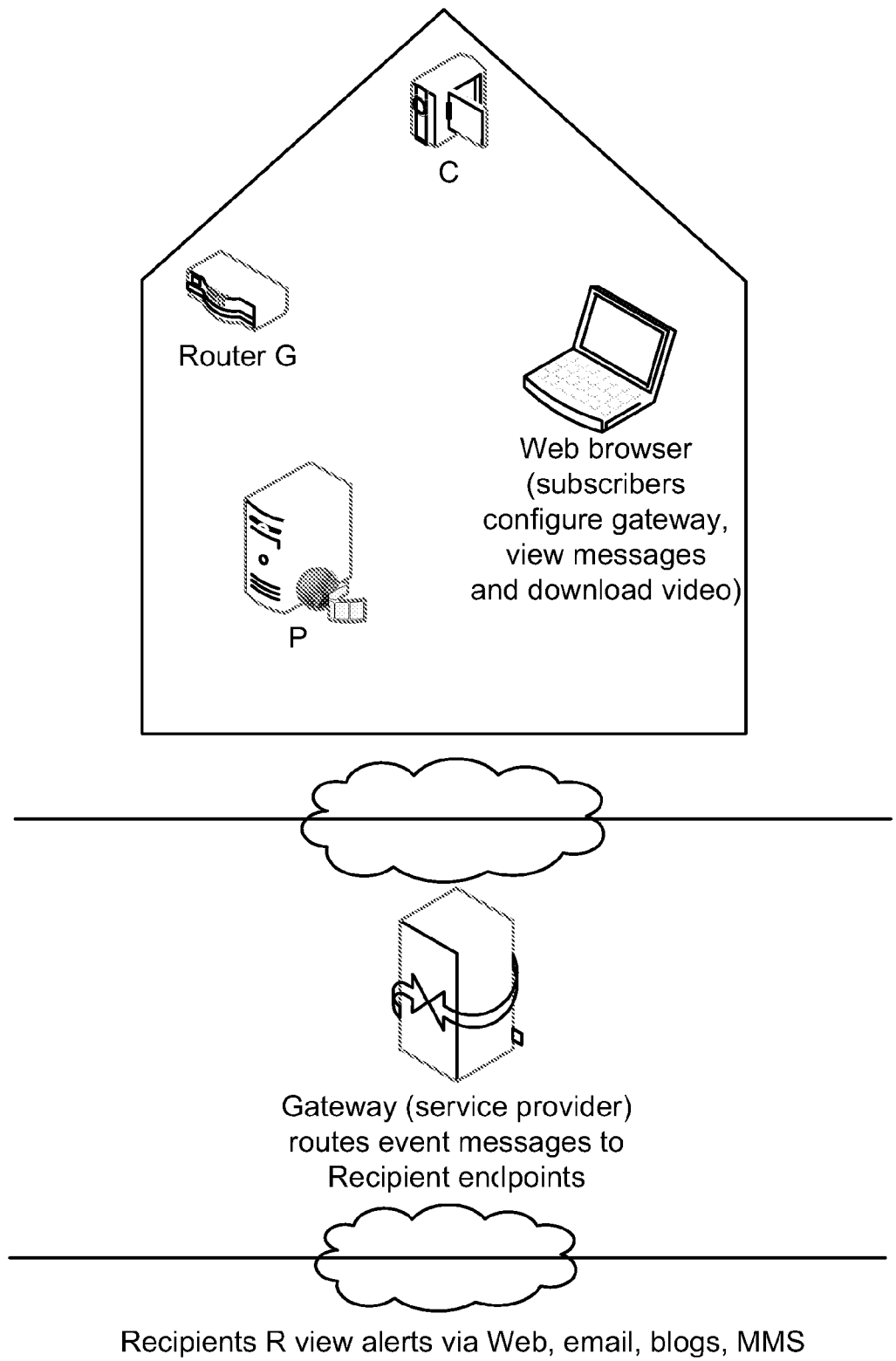

As illustrated in FIGS. 5 and 6, the system can verify alarms or other user-defined events and can push alerts (which, as described below, may include video, text and/or other content) to selected endpoints or recipients R, for example wireless or mobile endpoints, as the events occur. During an alarm condition, for example when an alarm sensor AS is triggered, video data VD collected at the monitored premise MP can be analyzed for specific events; the system can identify those events when they occur and alert a user or other recipient R by pushing an alert via any one or more of many routes or mechanisms, such as the World Wide Web, email, blogs or multimedia messaging service (MMS). Recipients may access alerts or video at any time from any web browser or video-enabled wireless device. The alerts may be pushed directly from a monitored premise MP (e.g. via gateway G local to monitored premise MP) to a recipient R, rather than being processed through a central server or processor remote from the monitored premise MP. Alternatively, the alert may be pushed through a remotely-located gateway.

Figure 7:
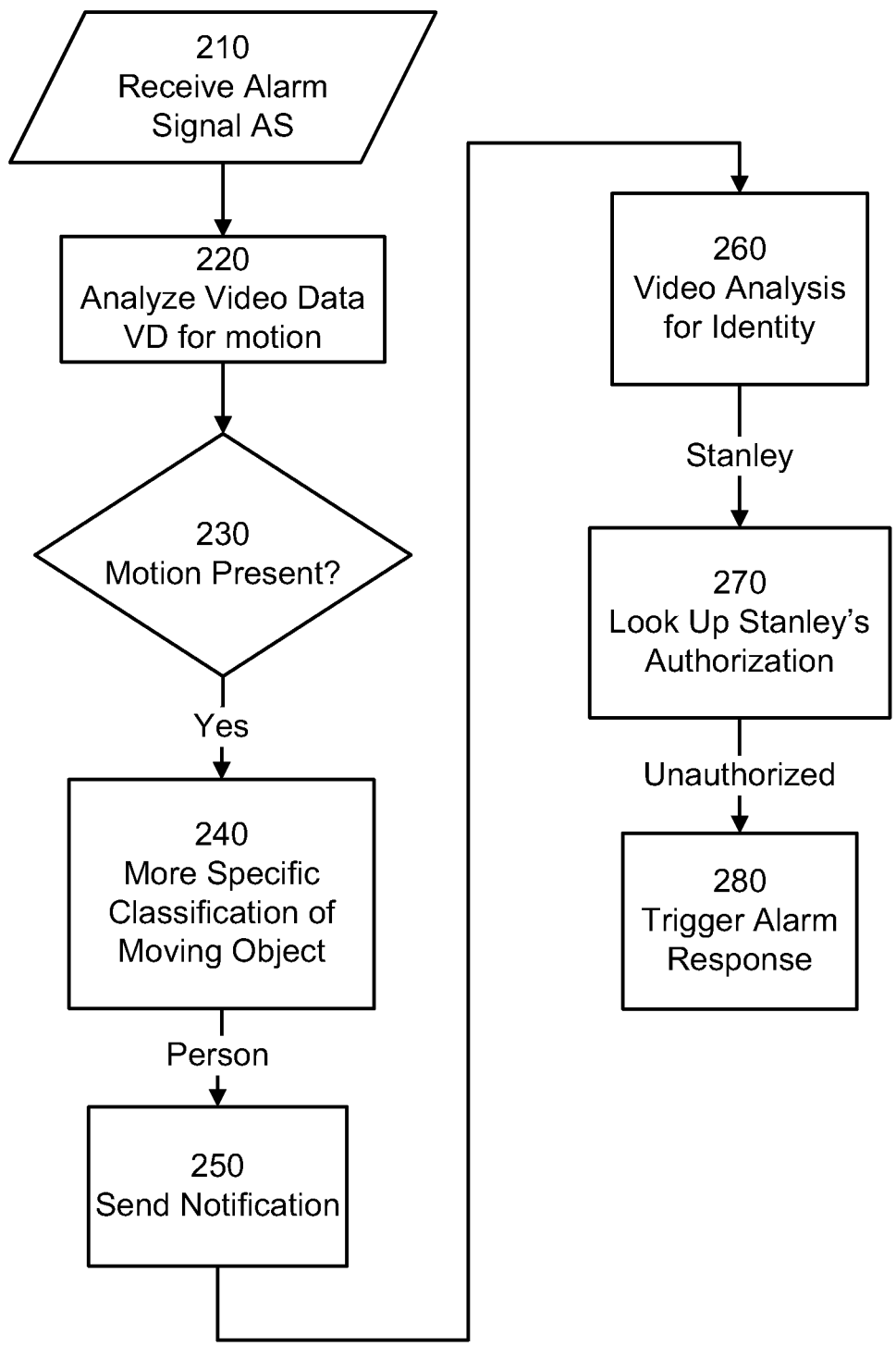
FIGS. 7-8 are schematic representations of embodiments of methods of the invention.

Analysis of video data VD can be conducted sequentially or hierarchically to verify and classify an alarm event and to determine the appropriate action to take in response. Analysis can be conducted according to a process flow based on a user defined profile (described in more detail below). For example, as illustrated in FIG. 7, step 210, when an alarm signal AS is generated by an alarm sensor S (such as a motion detector), the next step can be a motion detection analysis of the corresponding video (step 220) to confirm motion. If motion is confirmed (step 230), the next step can be a more specific classification (240) of the moving object, such as a person, vehicle, animal, or other object. If the analysis determines that the movement was a person, an alert, with or without a relevant video clip, can be transmitted to a defined recipient or recipients (250), while further, even higher hierarchical analysis simultaneously proceeds. The clip can be compressed according to the specifications of the user defined profile. For example, a detailed, high quality excerpt can be sent to recipients with sufficient broadband capacity, such as to a dedicated central security monitoring station, while a smaller, lower quality, more highly compressed excerpt can be sent to an individual user, such as a homeowner, at a mobile device. Alerts can be sent to recipients in various forms, including email, text message, MMS, voice calls or other alert modes.

In the embodiment illustrated in FIG. 7, the identity of the person confirmed after step 240 is determined—the person detected is "Stanley." The analysis then proceeds to the next level in the hierarchy—testing to see if Stanley possesses authorization to be where he was detected at the particular time at which he was detected. This analytical step is carried out with reference to the user defined profile. If the profile reflects that the person identified by the video analysis possess authorization for the identified access or activity, the no alarm signal is verified—this would have been a false alarm because the detected individual in fact does possess the requisite authorization. However, as shown in FIG. 7, if with reference to the user profile, the person positively identified as Stanley by the video analytics does not possess the requisite authorization ("unauthorized"), so an alarm condition is verified (280).

In some embodiments, the process flow that defines hierarchical video analysis can be made to depend upon the nature of a trigger event, the time at which it is received, the frequency and/or distribution of trigger events during a particular time window, the zone in which the trigger event occurs, or other environmental, temporal, or situational factors.

Analysis of video data VD and alarm signal(s) AS can be based on many inputs and parameters. For example, a user of the system can specify a user profile to determine what anomalous or noteworthy content or events to confirm. The response alert scheme can be made to depend on different times of day, days of the week, or holidays. A profile can contain properties or parameters for various aspects of the system and rules that govern system functions based on these properties. The system can use any combination of sensors and inputs as a part of the criteria used by the user defined profile to specify how video content is treated, encoded and/or transmitted. Users can define multiple profiles for different circumstances and times. Additionally, different combinations of alerts can be programmed into a profile for different time segments, for example throughout a 24-hour period, week, month, or year, giving users the flexibility to easily customize their service to suit specific lifestyle patterns and needs.

Figure 8:
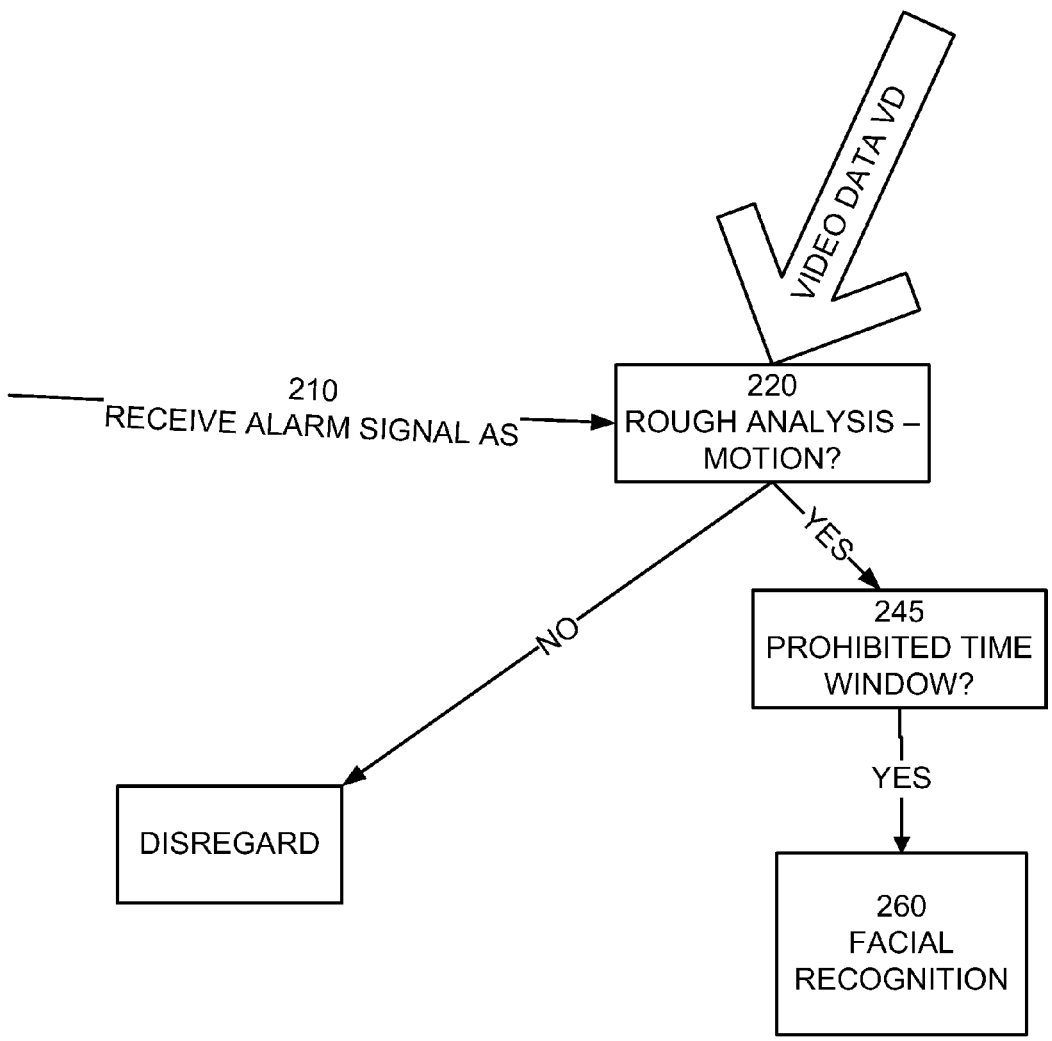

For example, as illustrated in FIG. 8, when a trigger event creates an alarm signal AS at an alarm sensor S (for example a motion sensor, not shown) at step 210, the alarm signal AS is received by the video analytics processor which then performs a rough analysis on the incoming video data VD in order to look for motion (step 220). If no motion is detected at step 220 based on an analysis of the video data VD, then the alarm signal AS is disregarded (false alarm). However, if the rough analysis for motion at step 220 confirms the existence of motion at the monitored premise MP, the inventive alarm verification system can refer to a user-defined profile to check whether motion is unexpected at the time or date of the detected motion (step 245). For example, such a scenario can occur at a new car dealership, which has hours of operation during which the lot is open to public browsing of the inventory and detectable motion is therefore expected. However, after-hours the lot closes its gates and people are no longer allowed on the property. The user profile can reflect this time window information to check for real and false alarms based on the schedule of the user.

Optionally, the alarm verification system can perform further analysis. As illustrated in FIG. 8, the video analytics confirmed motion at step 220 during what was, according to the user profile, a generally prohibited time window (step 245). However, the embodiment illustrated in FIG. 8 continues to assess the situation to avoid false alarms—in this case, a further step is performed to perform facial recognition via the video analytics to determine if the detected motion is authorized, e.g., that of the general manager of the dealership, who would like to be able to enter the premise to personally inspect the inventory and the physical security of the facility, without setting off the alarm. This analysis is performed at step 260.

Figure 9:
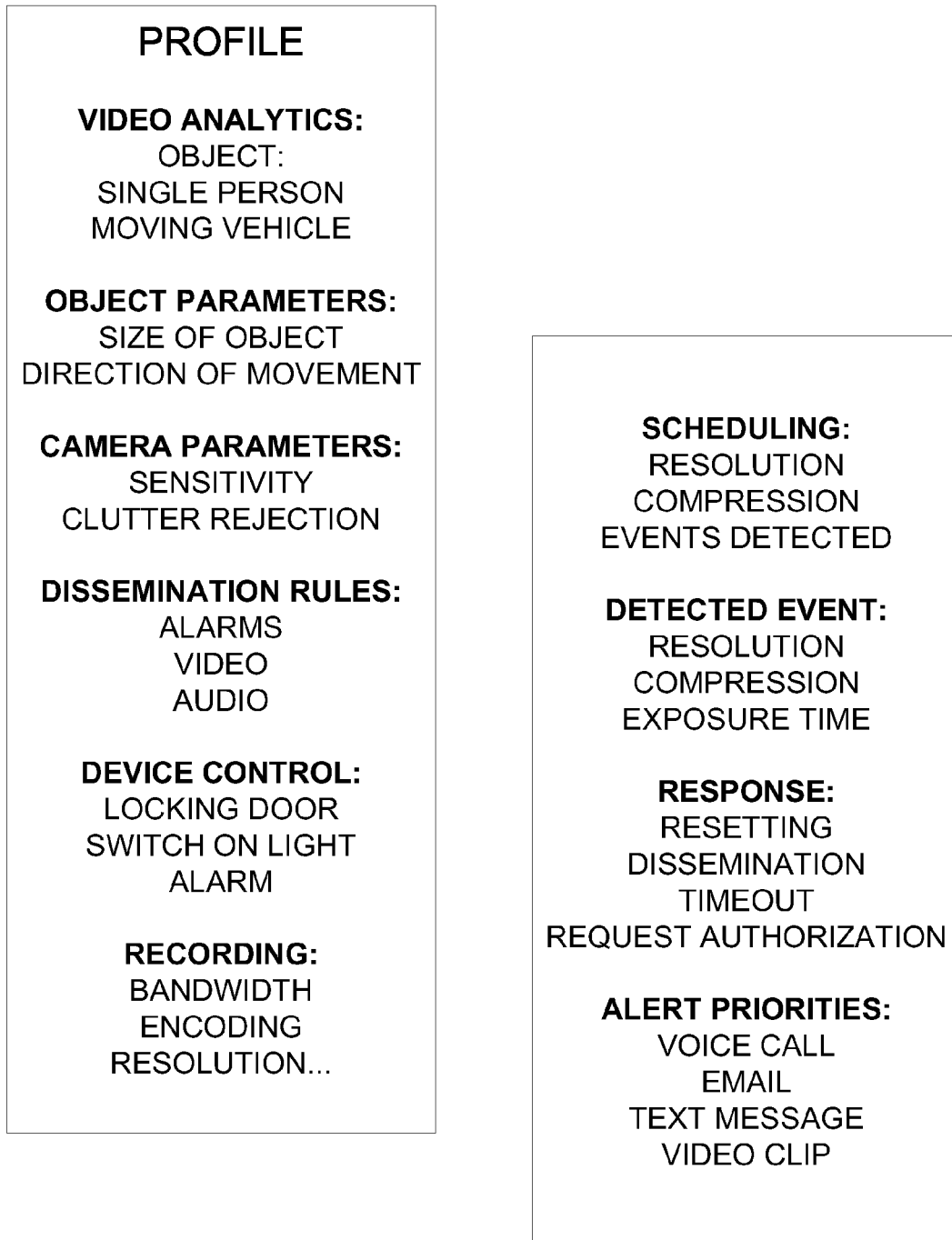
FIGS. 9-10 illustrate embodiments of methods of the invention.

As illustrated in FIG. 9, a profile can also specify video analytics properties or parameters controlling analysis for event recognition and alarm verification. Multiple video event detection capabilities can be provided such as the detection of a single person, of a stationary object or of a moving vehicle. These profiles enable or disable the detection of specific events. Additionally, profiles can specify control parameters for each event, such as the size of the stationary object or the direction of movement of the vehicle. Additional parameters for event recognition can include sensitivity, the ability to reject clutter in the scene due to environmental effects (e.g., rain, snow, waves) or illumination effects (e.g., shadow, glare, reflections) and the degree (amount) of clutter rejection.

As further illustrated in FIG. 9, profiles can further define device properties to control devices that are used for recording, staging and viewing video and alerts. The profile ties the user, device, analytics and recording properties. Device properties include capabilities such as storage capacity, bandwidth, processing capacity, decoding capability, image display resolution, text display capabilities and supported protocols such as email (e.g., POP, SMTP, IMAP), SMS (text messaging), RSS, web browser, media player, etc.

User profiles can also be used to specify dissemination rules governing how alerts are disseminated to users and devices. A dissemination rule provides a mapping between an event or multiple events and actions resulting from these events. As FIG. 9 illustrates, actions can be any combination of alarms, electronic communication in the form of text, multimedia attachment, streaming video, or in the form of device control ranging from locking a door, switching on a light or sounding an alarm. One example interaction may be to switch on an exterior light only when a person is detected, but not if a vehicle is detected, or to sound the doorbell when a person is detected within a certain distance from a door. Additionally, recording properties may be modified or further analysis may be triggered. Further, the inventive alarm verification system leverage video analysis to allow for specific dissemination rules to be created based on the classification, identity, movement, activity, and/or behavior associated with detected events. For example, in some embodiments, a user profile can be created to direct the video analytics processor to identify a pre-defined behavior, such as "loitering." The profile can associate verified loitering behavior with a particular recipient, such as law enforcement, while at the same time recognizing "mailman" behavior and sending a verified alarm signal corresponding to the detection of this behavior to a private user. These dissemination rules can be provided, programmed, and modified by the user of the system as necessary. FIG. 9 illustrates some dissemination rules that can be maintained in the user profile in one embodiment.

Profiles can also be defined according to a schedule. Scheduling rules specify a mapping between the date, time and properties. As is illustrated in FIG. 9, camera properties such as resolution or compression quality may be modified based on the schedule. Similarly, the set of events detected and their properties can be changed on a schedule. The properties of a camera may also be changed according to a profile, as a function of a detected event. For instance, in order to enable optimal conditions for capture of a license plate of a vehicle. At night, based on the detection of a vehicle and an estimate of its speed, the exposure time for the camera could be adjusted to capture a non-blurred version of the license plate.

Profiles can also define the response that is desired upon the occurrence of a particular verified alarm. As illustrated in FIG. 9, these rules specify mechanisms for clearing or resetting an event condition and the dissemination rules and responses triggered by an event. A response may be as simple as a timeout after which all conditions are cleared or reset. Other embodiments of response rules include automated clearing of event conditions when any video is requested or viewed regardless of the user or any device-initiated actions. More complex response rule embodiments could require the user to interact with a local or remote device, or send an electronic communication back to the system which could then authorize the action and clear the condition.

Further, the user-defined profile can specify various alert priorities, for example, based upon different alert conditions. The alert priorities can have different associated levels and modes of alert. For example, for a critical alert a user can specify that the user would like to be notified by a voice call to his or her cell phone. The call can contain a recorded message alerting the user of the associated alert condition. Another level of alert priority can be associated with a different level of notification, for example, an email or a text message. Additionally, the user profile can specify that a selected segment of video associated with the alert condition be downloaded automatically to the user's mobile device.

For example, a user can specify that in the case of an unexpected vehicle parking in the driveway, the selected segment will be sent from the analytics processor to a central server. The central server can then, according to the user defined profile, send an instruction to the user's mobile device, for example, a cell phone, personal digital assistant, smart phone or a laptop computer, to download the selected segment and simultaneously notify the user. The central server can encode the selected segment in order to facilitate transmission to low bandwidth devices, for example, over wireless networks. The user's end device can be configured to decode and play back the selected segment. Additionally, based on video analytics, specific parts of the image that correspond to the verified alarm condition may be encoded at a higher bit rate and/or quality of encoding.

Figure 10:
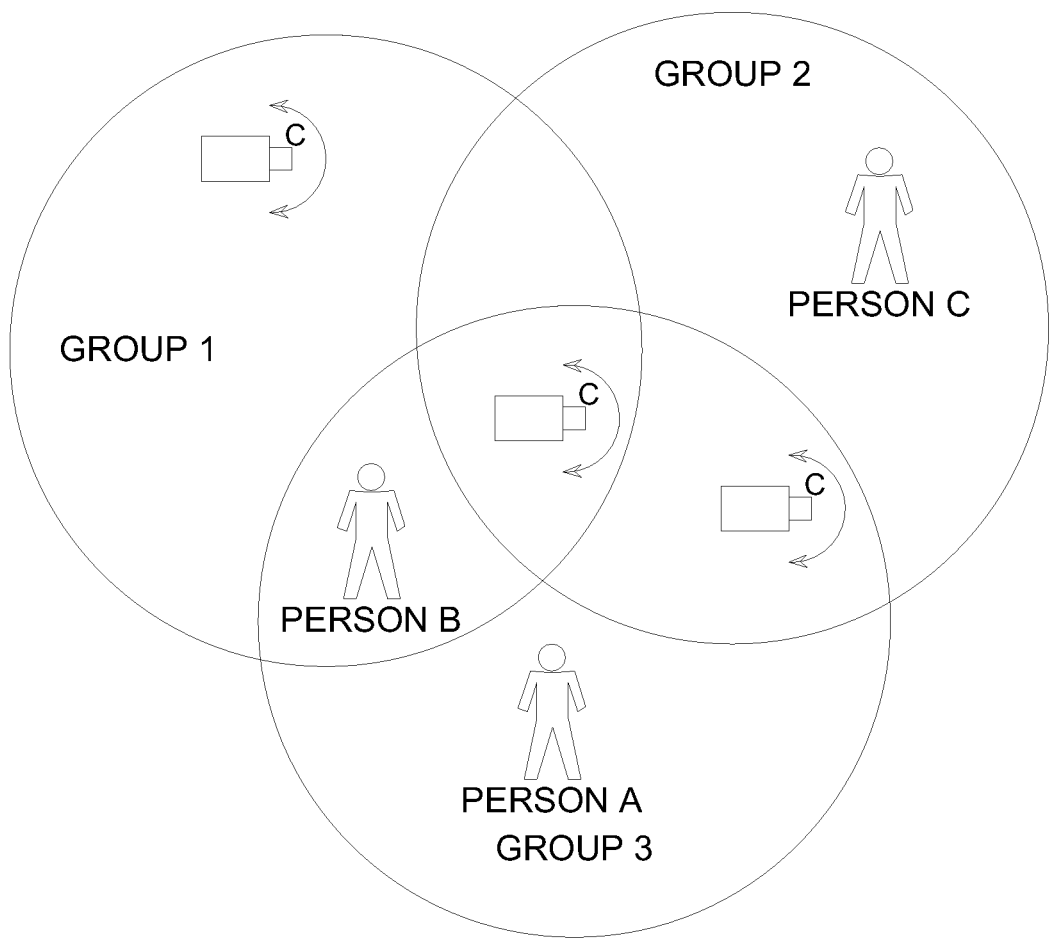

Different groups may be created, each with a particular associated profile. As illustrated in FIG. 10, groups may be created for cameras, recorders, analytics, users, devices and responses. Each member of the group inherits the properties of that group. Membership in multiple groups is possible. For example, a camera group may include all cameras that are from a single manufacturer and are set up for video at CIF resolution at 15 frames per second, using MPEG-4 Simple Profile compression over the RTP protocol. An analytics group may include a set of "outdoor, parking lot" events such as loitering person and illegally parked vehicle with clutter rejection set for sunlit illumination under snowy conditions. Additionally, a set of rules govern the interaction of cameras, users, devices, recording and analytics. These interactions are driven by the results of the video analysis.

Figure 11:
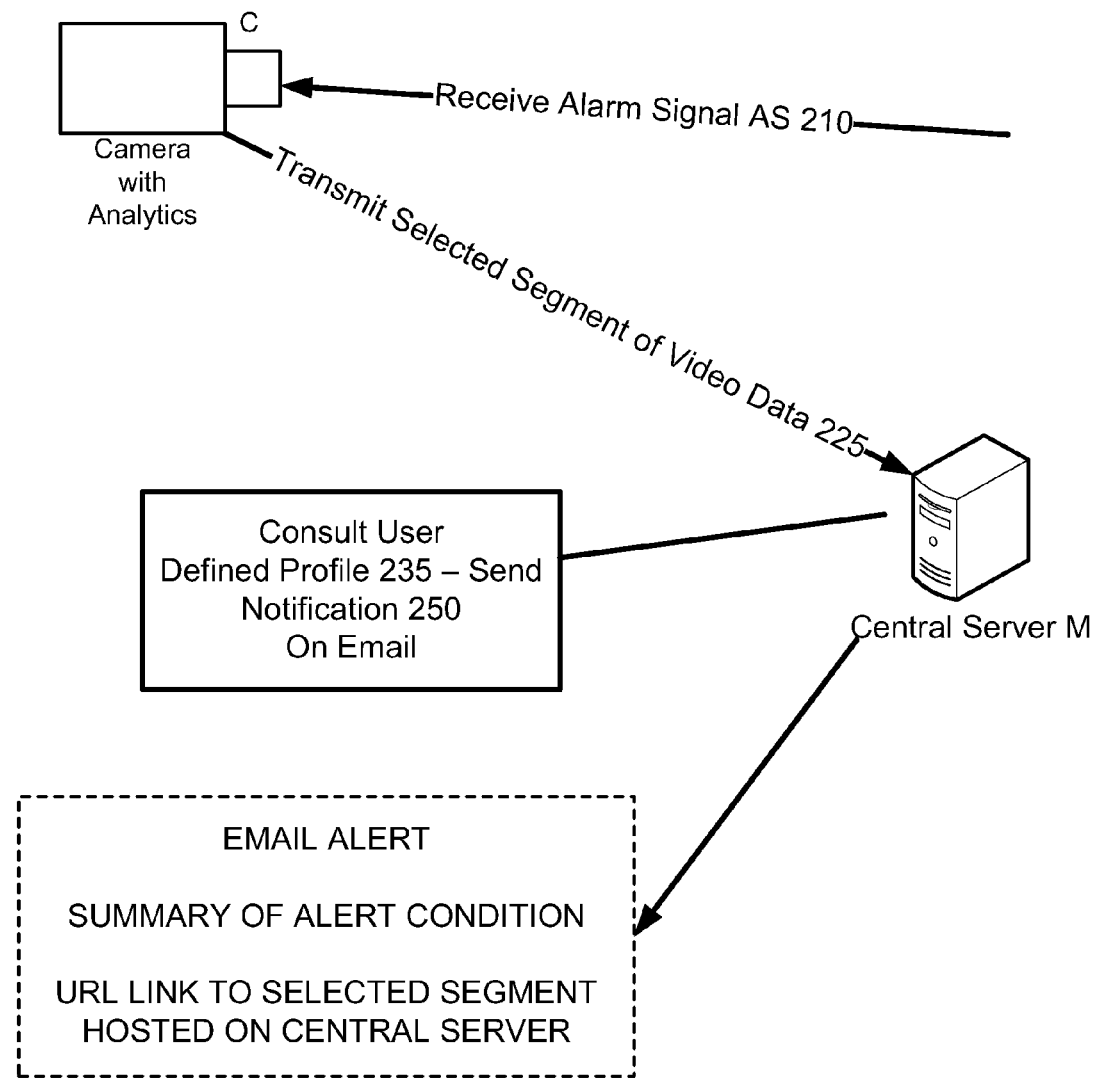
FIGS. 11-14b illustrate schematic representations of embodiments of methods of the invention.

As illustrated in FIG. 11, camera C equipped with video analytics operating under the direction of a user profile can receive an alarm signal AS (step 210). The camera C equipped with video analytics can cause a selected segment of video data associated with the alarm signal AS to be optionally sent to a central server M. Central server M can be located in a distinct location from the monitored premises MP, for example for additional security. The analytics embedded in camera C can select only the relevant segments of video data as specified by the user defined profile to send to the central server M (step 225). The central server M can then consult the user defined profile (step 235), also stored at central server M, in order to determine whether to verify the alarm condition and if so, what action to take in response to the receipt of the selected segment of video data. The central server M can, for example, determine that according to the user defined profile and based upon the contents of the selected segment of the video data received, a user will be sent a notification on email (step 250). The notification on email can contain a summary of the alert condition and can contain, for example, a link or URL address to enable the user to view the selected segment of the video located on the central server M. Alternatively, the camera C equipped with video analytics can merely transmit a video segment temporally associated with the receipt of alarm signal AS to the central server M. The video analytics can also be present instead at the central server M.

Figure 12:
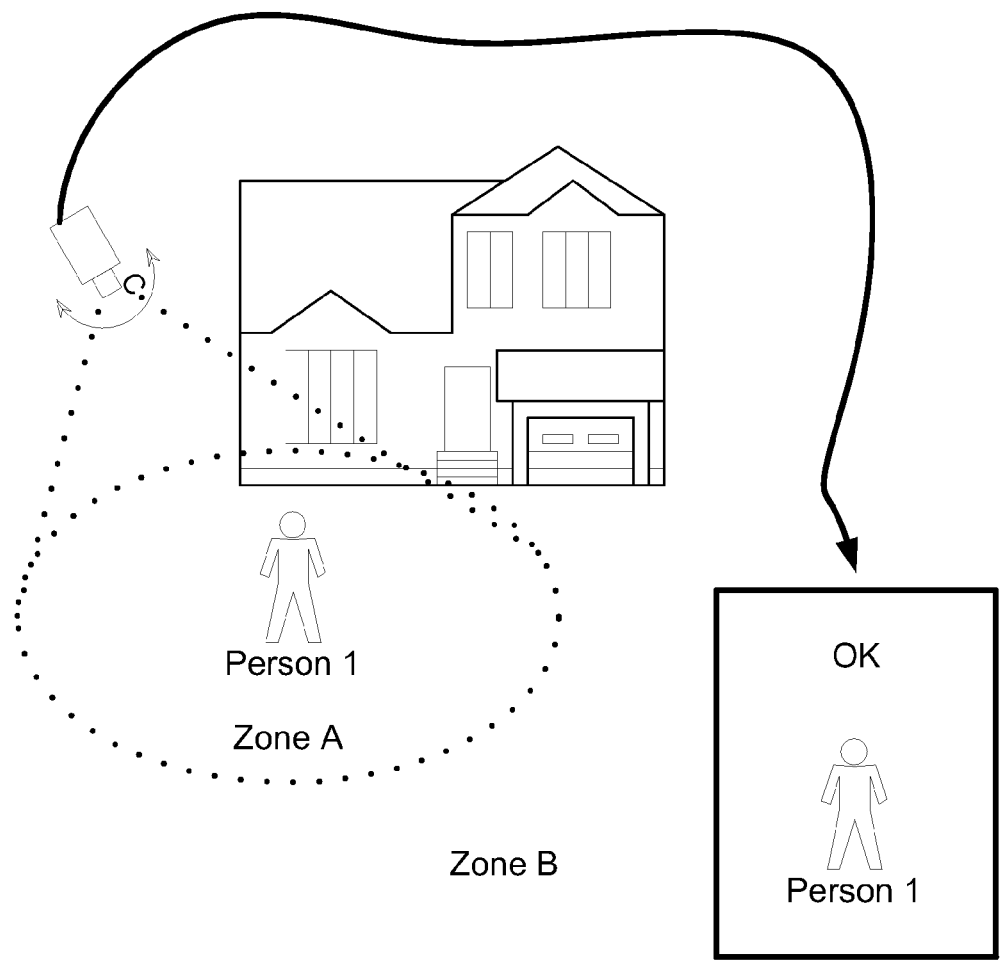
Figure 13:
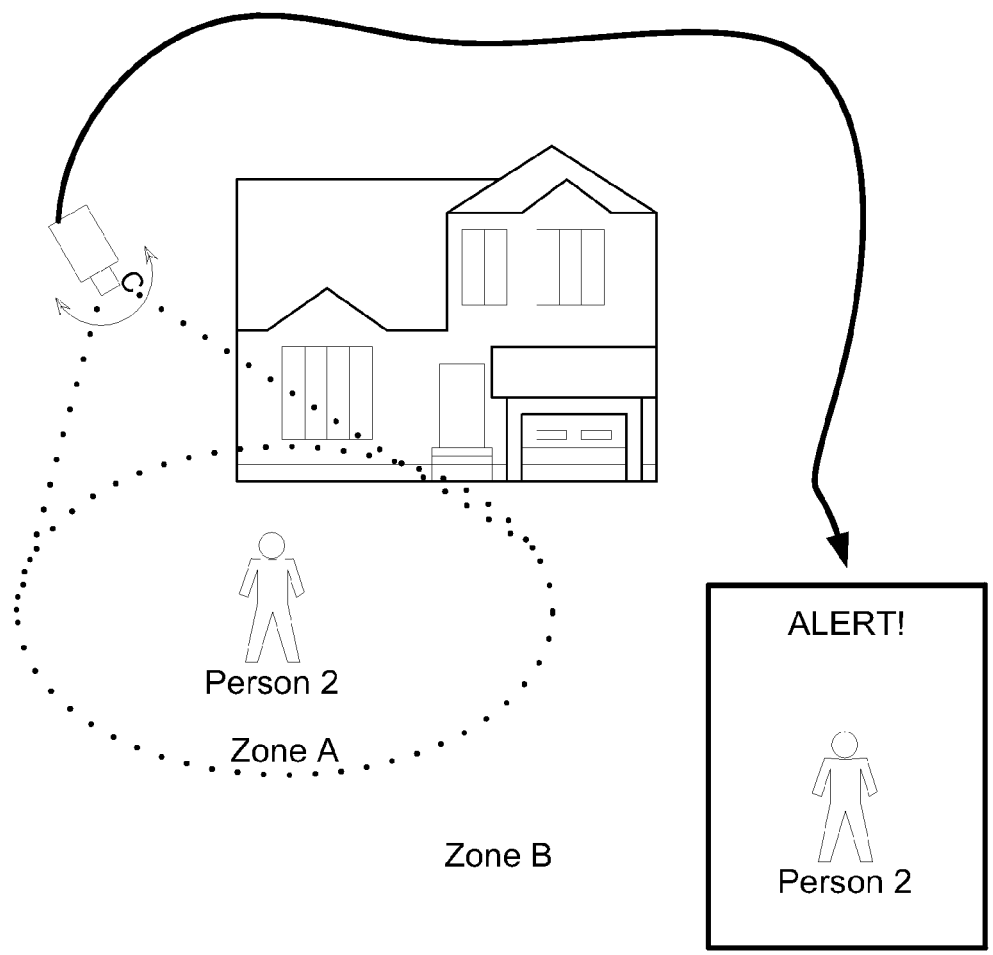

Referring to the embodiment shown in FIGS. 12 and 13, a user-defined profile can be programmed to recognize when a person enters a camera's field of view and make decisions about how to respond based on the identity of the person. Different conditions of alerts may also be programmed for different locations or zones within a camera view. For instance, an outdoor camera looking at the door and driveway could be set to alert on the presence of a car in the driveway zone, and the presence of a package near the door. User profiles can be used to create different alert parameters and behaviors for different zones—each zone can correspond to a different premise, and the video analytics can then consult the user profile to determine what constitutes a significant event based on the zone of the premise. FIG. 12 illustrates an embodiment wherein detected motion near the front door of a residence does not constitute an alarm condition when the motion is associated with the presence of the resident of the house—"Person 1." Person 1 is authorized to be present in Zone A—approaching the front door to the house—as well as in Zone B—the area around the house and near the street. Other people, for example Person 2 illustrated in FIG. 13, are authorized in Zone B but not in Zone A.

In related embodiments, a camera can be facing a door, for example a front or back door of a residence in order to monitor household traffic. In this embodiment, a user can be alerted, for example, as soon as a person approaches within a specified distance from the monitored door. In conjunction with a door contact sensor, the system can allow the user to confirm when a person opens a monitored door, for example to know as soon as a child comes home from school, and to receive an alert if the entry is unauthorized.

Figure 14A:
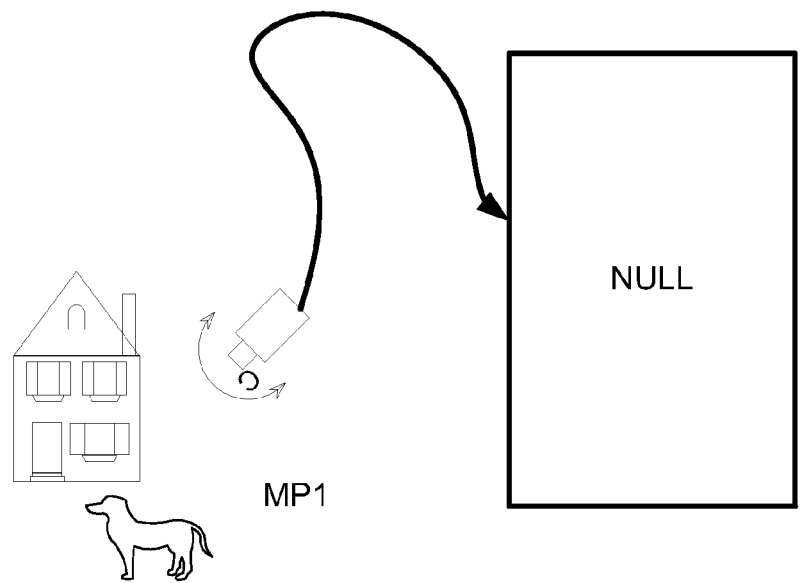
Figure 14B:
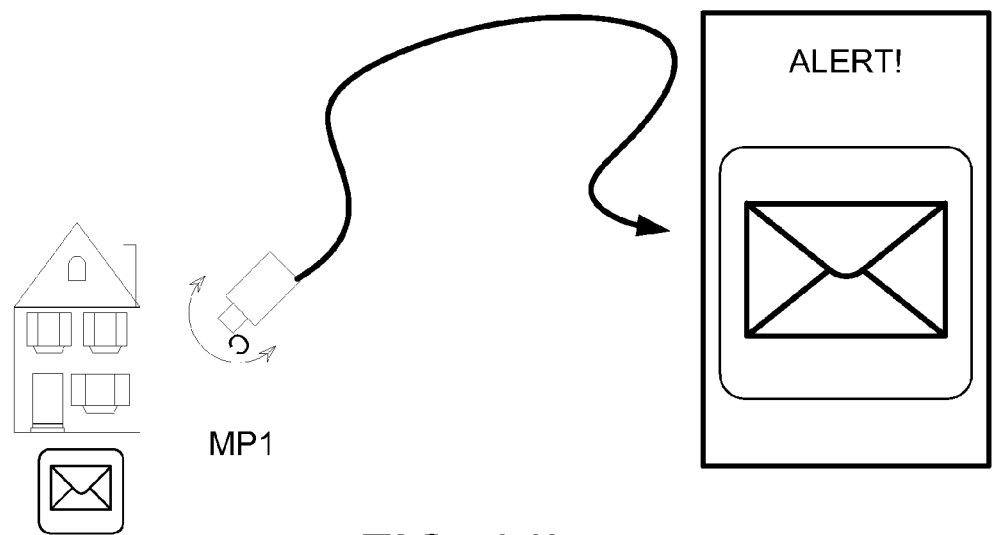

FIGS. 14A and 14B further illustrate how the user profile can be programmed to provide the desired alert behavior for a particular zone. In FIG. 14A, a neighborhood dog is creating motion at the monitored premise MP1. A motion detector S located at MP1 (not shown) generates an alert signal AS as a result of the activity and presence of the neighborhood dog. However, the user profile for the zone, MP1, is not programmed to alert on the presence of dogs, and therefore, the video analytics do not verify an alarm condition under the circumstances of FIG. 14A. In contrast, in FIG. 14B, the motion detector S (not shown) detects the presence of a package placed on the doorstep by a postal carrier, and sends a corresponding alert signal AS to the video analytics processor, which detects the presence of what it recognizes as a package. When the video analytics processor consults the user profile corresponding to Zone MP1 in order to determine how to respond, the user profile specifies that the presence of a package is an alert condition and an alert in therefore generated (alarm verified).

In an alternative embodiment, a motion detector along with an appropriate user-defined profile can leverage the ability of video analytics to sense "ghosting". Such embodiments can be used to cause an alert to be sent when an object is removed from a defined monitored area. In this sort of embodiment, a motion detector or other sensor and camera can overwatch a home office, artwork, office safe, or other valuables. The system can analyze the collected, associated video signal to confirm an alert condition and alert a user, according to a user profile, when valuables are removed from their usual locations.

Figure 15:
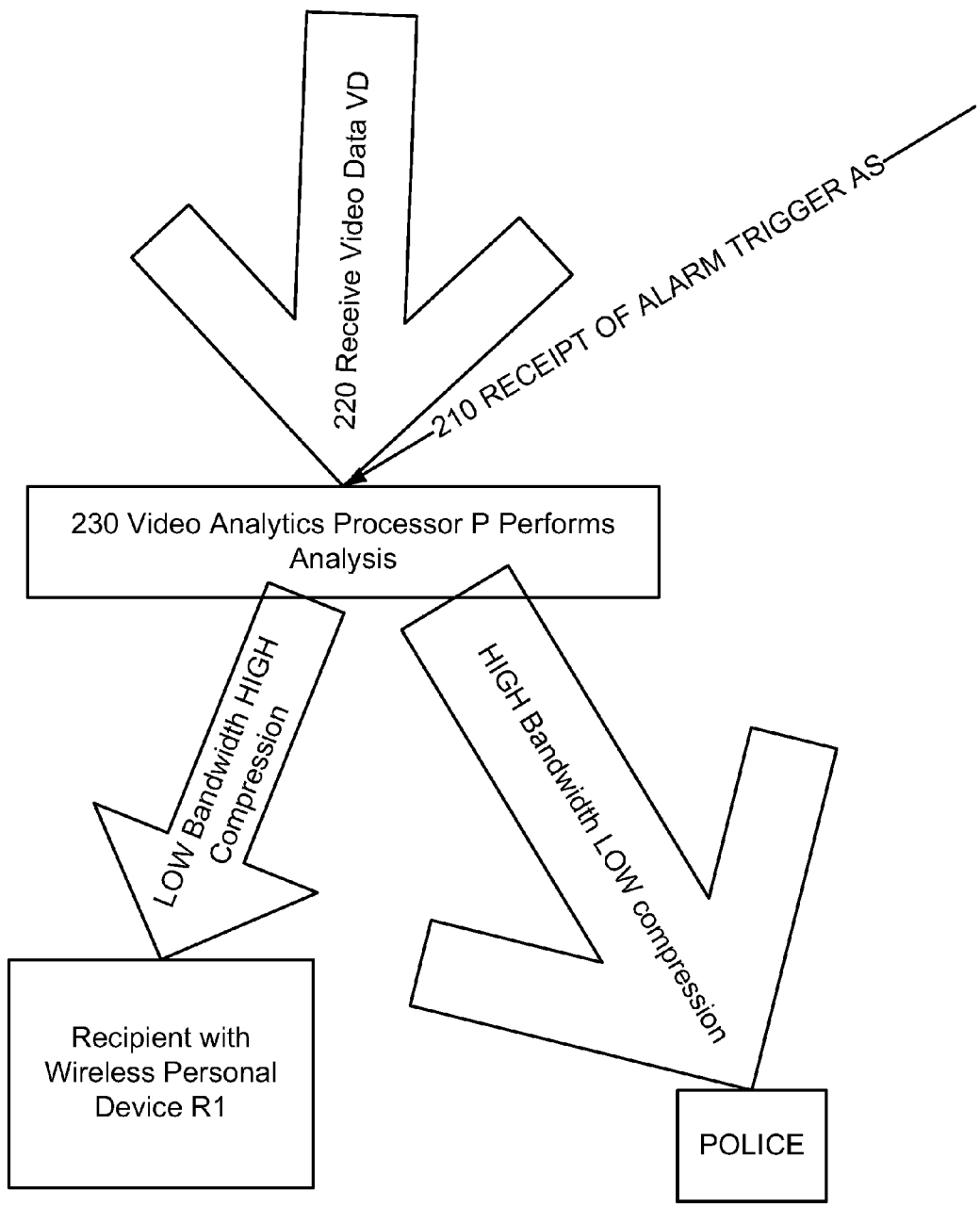
FIG. 15 illustrates a schematic embodiment of a method of the invention.

Video segments can be sent, either directly from the monitored premises or relayed from an intermediate central server, to recipients in encoded, un-encoded, compressed, uncompressed or another format, depending on the capabilities of the recipient and the need for quality in the transmitted video. Portions of video corresponding to times immediately before and after the alarm trigger can also be sent. In embodiments, upon the verification of an alarm, alerts, with or without video excerpts, can be sent to other parties, such neighbors or relatives. These variable are controlled by the dissemination rules contained in a user profile. FIG. 15 illustrates how an embodiment uses dissemination rules contained in a user profile to direct an alert to the desired recipient in the desired manner. As illustrated in FIG. 15, once the system receives an alarm signal AS at step 210, the video analytics processor P analyzes 230 the video data VD stream, received at step 220, to verify or deny a potential alarm condition with reference to the user profile. In the embodiment of FIG. 15, the user-defined profile also specifies that alerts including selected segments of video be sent to the police. The dissemination rules at work in the embodiment shown in FIG. 15 specify that portions of video to be sent to the police are sent in high-quality format, and receive little compression. The dissemination rules in the embodiment shown in FIG. 15 also dictate that a smaller, more compressed video clip associated with the alarm trigger event be sent to a user's mobile wireless personal electronic device R1. The user profile calls for higher compression in this case due to the bandwidth limitations associated with transmission of video to wireless personal devices, and because a high-quality excerpt is also preserved and sent to the police as well.

Figure 16:
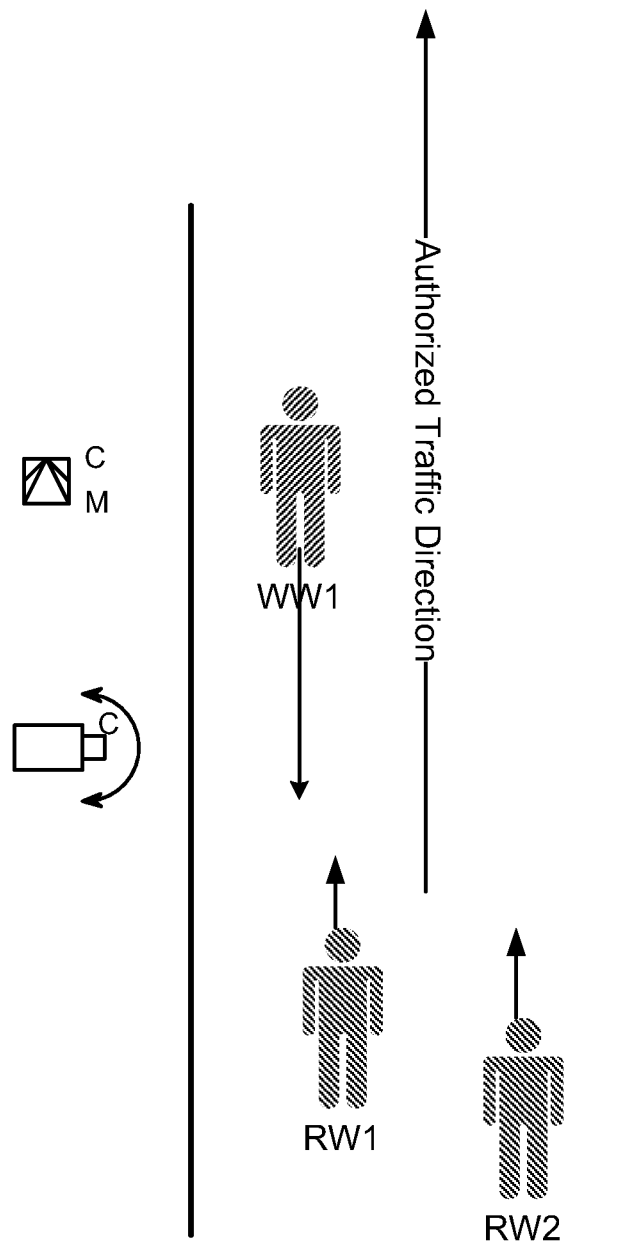
FIG. 16 illustrates representations of an embodiment of a method of the invention.

The disclosed technology can also be used, in embodiments, to detect and alert a user to wrong-way motion. FIG. 16 illustrates such an embodiment. This embodiment is used with motion detectors and/or other sensors C M to alert on the presence of a person in a zone. The combination of the sequence of spatially-arranged sensors C M, when triggered in a pattern, may tend to indicate person WW1 walking the wrong way in an exit area. Camera C, equipped with video analytics, separates WW1 from the background and tracks WW1 over multiple frames to confirm the wrong-way motion of WW1. This embodiment of the disclosed technology leverages video analytics to accurately confirm wrong way motion in circumstances of heavy traffic and crowding that would confuse or disable existing solutions. This is enabled by the tracking capabilities inherent in the associated video analytics, which when applied in the novel way disclosed herein, can effectively reduce false alarms for wrong-way motion and significantly leverage the human capital required to provide an adequate level of security to a facility.

What is claimed is:

1. A method for authenticating an alarm, comprising:
receiving from an alarm sensor at a monitored premise an alarm signal associated with an event at the monitored premise;
receiving video data of the monitored premise from a video source associated with the alarm sensor;
conducting video analytics on the video data to detect the event in a segment of interest of the video data;
identifying an event type associated with the event;
selecting a level of encoding for the segment of interest of the video data based at least in part on the event type being associated with a profile;
encoding the segment of interest based on the level of encoding to produce encoded video data having a bit rate different than a bit rate of the video data;
selecting a level of encoding for a portion of the video data different from the segment of interest, the level of encoding for the segment of interest being different from the level of encoding for the portion of the video data; and
sending a representation of the encoded video data to at least one recipient.

2. The method of claim 1, wherein the alarm sensor is selected from a group consisting of a motion sensor, a glass breakage sensor, a door contact sensor, a window contact sensor, an infrared sensor, a sound sensor, a pressure sensor, a tension sensor, a magnetic sensor, a temperature sensor, a humidity sensor, and a fire or smoke sensor.

3. The method of claim 1, wherein the alarm sensor is selected from a group consisting of an electronic access control system output, a security keypad, and a biometric identification system.

4. The method of claim 1, further comprising:
retrieving routing instructions from the profile in response to the encoding, the sending includes sending the representation of the encoded video data according to the routing instructions.

5. The method of claim 1, wherein the conducting video analytics includes consulting the profile to determine parameters for use in the video analytics.

6. A system for verifying alarms, comprising:
a video analytics module configured to analyze video data received from a video source associated with a monitored premise to determine an identity of a person in the video data based at least in part on a user-defined profile, the video analytics module configured to determine an authorization level of the person based on the identity, the video analytics module configured to determine, based on the authorization level, that the person is unauthorized, the video analytics module configured to verify an alarm condition at the monitored premise in response to the person being unauthorized;
an encode module configured to receive from the video analytics module a confirmation of the alarm condition including a representation of the video data, the encode module configured to encode using a first level of encoding, based on the confirmation of the alarm condition, a first portion of the video data to produce encoded video data, the encode module configured to select a level of encoding for a second portion of the video data different from the first portion of the video data, the level of encoding for the first portion being different from the level of encoding for the second portion; and
an alert module configured to receive from the encode module a confirmation of the alarm condition, including a representation of the encoded video data, the alert module configured to send to a recipient an alert including a representation of the encoded video data regarding the alarm condition.

7. The system of claim 6, further comprising:
a profile module storing the user-defined profile including parameters associated with temporal variance of the operation of the alert module based on at least one of a time of a day, a day of a week, a day of a month, or a time period.

8. The system of claim 6, wherein the user-defined profile stores a user-defined process flow, the video analytics module is configured to perform hierarchical analysis of the video data by executing the user-defined process flow to verify the alarm condition.

9. The system of claim 6, wherein the alert module is configured to select the recipient based on a type of the alarm condition and the user-defined profile.

10. The system of claim 6, wherein the video analytics module is configured to determine a degree of video analysis to be performed on the video data based on a type of the alarm condition and the user-defined profile.

11. The system of claim 6, wherein the video analytics module is configured to analyze the video data to detect the presence of or movement by an object prior to identifying the object as the person.

12. The system of claim 6, wherein the alert module is configured to format the alert based on an identity of the recipient of the alert.

13. The system of claim 6, wherein the alert module is configured to define the alert to include video data of the monitored premise associated with a time period including at least one of a time period preceding the alarm condition or a time period subsequent the alarm condition.

14. The system of claim 6, wherein the alert module is configured to define the alert to include video data of the monitored premise associated with a time period preceding the alarm condition for transmission directly to at least one of a law enforcement authority or a centralized security station of a security service provider in response to the video analytics module recognizing the alarm condition as an emergency situation.

15. The system of claim 6, wherein the alert module is configured to define the alert to include video information that is at least one of compressed or encoded in a specific manner based on an identity of the recipient.

16. The system of claim 6, wherein the authorization level is associated with the monitored premise.

17. The system of claim 6, wherein the authorization level is associated with a specific time period.

18. The method of claim 1, wherein the level of encoding for the segment of interest is a first level of encoding and the encoded video data is first encoded video data, the sending includes sending the first encoded video data to a storage server to be cached, the method further comprising:
encoding the segment of interest based on a second level of encoding different from the first level of encoding, to produce second encoded video data different from the first encoded video data; and sending a representation of the second encoded video data to the at least one recipient.

19. The method of claim 1, wherein the selecting the level of encoding for the segment of interest includes selecting the level of encoding for the segment of interest based at least in part on a device type associated with the at least one recipient.

20. The method of claim 1, wherein the representation of the encoded video data includes the encoded video data.

21. The method of claim 1, wherein the representation of the encoded video data includes a link to provide access to the encoded video data.

22. The method of claim 1, wherein the profile is a user-defined profile.

23. The method of claim 1, wherein the profile is from a plurality of profiles, each profile from the plurality of profiles includes parameters associated with an authorization level of the event based at least in part on at least one of the event type, a schedule associated with the event, a time of a day, a day of a week, a day of a month, or a time period.

24. The method of claim 1, wherein the video analytics is conducted at a video analytics module collocated with the video source.

25. The method of claim 6, wherein the user-defined profile includes transmission limitations associated with the at least one recipient.

26. The system of claim 6, wherein the user-defined profile is from a plurality of user-defined profiles, each user-defined profile from the plurality of user-defined profiles includes parameters associated with an authorization level of the person based at least in part on at least one of the identity of the person, a schedule associated with the person, a time of a day, a day of a week, a day of a month, or a time period.

27. The system of claim 6, wherein the video analytics module is collocated with the video source.

28. A method comprising:
receiving from a first alarm sensor at a monitored premise a first alarm signal associated with an object at the monitored premise;
receiving from a second alarm sensor at a monitored premise a second alarm signal associated with the object at the monitored premise;
receiving video data of the monitored premise from a video source;
defining a direction of motion associated with the object based on the first alarm signal and the second alarm signal;
conducting video analytics on the video data to confirm the direction of motion associated with the object as an unauthorized direction based at least in part on a profile;
encoding a first portion of the video data using a first level of encoding to produce encoded video data;
encoding a second portion of the video data different from the first portion using a second level of encoding, the first level of encoding different from the second level of encoding; and
sending, based on the direction of motion associated with the object being an unauthorized direction, an alert, including a representation of the encoded video data, indicating the existence of an alarm condition.

29. The method of claim 28, wherein the profile includes sensitivity parameters associated with the object, the conducting video analytics includes rejecting the object at least based on the sensitivity parameters.

30. The method of claim 28, wherein the conducting video analytics includes detecting that one or more objects have been removed from the monitored premise.

31. The method of claim 28, wherein the profile includes control parameters associated with the object, the conducting video analytics includes detecting one or more stationary objects based at least in part on the control parameters.

32. The method of claim 28, wherein the conducting video analytics includes estimating a speed associated with the object.

33. The method of claim 1, wherein the sending the representation of the encoded video data, includes consulting the profile to determine at least one of the at least one recipient or a device type.

34. The system of claim 6, wherein the video analytics module is configured to receive a signal from a sensor associated with an event, the video analytics module configured to determine, based on the authorization level and the alarm signal, that the person is unauthorized.

* * * * *